US010083447B1

United States Patent
Chiarella et al.

(10) Patent No.: US 10,083,447 B1
(45) Date of Patent: Sep. 25, 2018

(54) FOLDING CONTACTLESS CARD PAYMENT AUTHENTICATION

(71) Applicant: International Business Machines Corporation, Armonk, NY (US)

(72) Inventors: Giacomo G. Chiarella, Eastleigh (GB); Daniel T. Cunnington, Chandler's Ford (GB); Eunjin Lee, Eastleigh (GB); Brad T. Roeger, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/596,549

(22) Filed: May 16, 2017

(51) Int. Cl.
| G06K 7/10 | (2006.01) |
| G06Q 20/40 | (2012.01) |
| G06K 19/077 | (2006.01) |
| G06Q 20/34 | (2012.01) |

(52) U.S. Cl.
CPC ..... *G06Q 20/4093* (2013.01); *G06K 19/0772* (2013.01); *G06K 19/07749* (2013.01); *G06K 19/07777* (2013.01); *G06Q 20/352* (2013.01)

(58) Field of Classification Search
CPC .......... G06K 19/02; G06K 19/07754
USPC ........................ 235/492, 375, 380
See application file for complete search history.

(56) References Cited

U.S. PATENT DOCUMENTS

| 5,710,421 | A * | 1/1998 | Kokubu | ............... | G06K 19/077 |
| | | | | | 235/380 |
| 8,301,566 | B2 * | 10/2012 | Mears | .................... | G06Q 20/04 |
| | | | | | 235/375 |
| 8,322,624 | B2 | 12/2012 | Finn | | |
| 8,640,950 | B2 | 12/2014 | Adams et al. | | |
| 2005/0144354 | A1 * | 6/2005 | Murashita | ............... | G06F 21/32 |
| | | | | | 711/100 |
| 2013/0056539 | A1 | 3/2013 | Iwaloye | | |

FOREIGN PATENT DOCUMENTS

| JP | 2001034278 A | 2/2001 |
| WO | 2010046127 A1 | 4/2010 |
| WO | 2016160816 A1 | 10/2016 |

OTHER PUBLICATIONS

Badbiosvictim. "RFID shielding wallets don't shield. RFID requires grounded faraday bag.: privacy" Reddit. Post submitted on Aug. 26, 2014.
Charlton. "Virtual pickpockets steal money from contactless bank cards by bumping into victims claims Londoner". Oct. 22, 2015. pp. 3.
Jensen et al. "A Secure Credit Card Protocol over NFC". ICDCN '16, Jan. 4-7, 2016, Singapore. Copyright 2016. DOI: http://dx.doi.org/10.1145/2833312.2833319.

(Continued)

Primary Examiner — Allyson Trail
(74) Attorney, Agent, or Firm — Stephen R. Yoder

(57) ABSTRACT

A folding mechanism is used to authenticate purchases when making transactions using a contactless smart card. By folding the contactless card in a precise manner, the electrical resistance of the antenna circuit of the contactless card is changed by bypassing the card's built-in resistors. A user may set a folding orientation as the "password" of the contactless card. This folding orientation determines the electrical resistance of the card necessary to authenticate a purchase.

20 Claims, 5 Drawing Sheets

(56) References Cited

OTHER PUBLICATIONS

Hancke. "A Practical Relay Attack on ISO 14443 Proximity Cards". Project report, posted Jan. 2005. Cambridge, UK. pp. 13.
Lee. "What Are RFID-Blocking Wallets & Which Should You Buy?" Jan. 30, 2017. Copyright 2017 MakeUseOf.
Sinclair. "Cardsharp2 Utility Knife (size of credit card)—KnifeCenter—YouTube". Uploaded on Dec. 20, 2011. <http://kcoti.com/SNO2Z.
"Making a Touch Sensitive Circuit with Electric Paint—Bare Conductive" WayBack Machine. Apr. 2, 2016. Bare Conductive. London.

* cited by examiner

FOLDING CONTACTLESS CARD PAYMENT AUTHENTICATION

BACKGROUND

The present invention relates generally to the field of smart cards, and more particularly to utilizing a folding mechanism for authentication purposes on smart cards.

Contactless payment systems are gaining widespread acceptance by retailers and are becoming increasingly popular among consumers. In contactless payment systems, consumers use a payment card that is equipped with an integrated chip and antenna that securely communicates consumer account information via a radio frequency communication link to a retailer's payment terminal. The payment terminal then connects to an appropriate financial network or other back-end processing system via, for example, a communication network, to authorize the transaction. Once authorized, the consumer completes the transaction. This scheme of contactless payment accomplishes a transaction at a convenience for a user in comparison with traditional credit cards or debit card transactions, which require a card to be swiped through a reader.

Contactless payment devices typically include a chip and antenna. The chip includes, for example, consumer account information. When the chip is brought into close enough proximity to a suitable reader, the antenna will be activated and will transmit the consumer account information residing on the chip to the reader. To avoid errors and ensure that the reader is communicating with the correct device, the proximity of the contactless payment device to the reader required to activate the antenna is typically on the order of a very few inches at most.

SUMMARY

Embodiments of the present invention disclose a method, a computer program product, and a computer system for authenticating purchases of a contactless smart card. The method comprises of recording an authenticating electrical resistance of an antenna circuit on the contactless smart card and determining communication between the contactless smart card and a receiver. The authenticating electrical resistance is recorded when the contactless smart card is folded one or more times. The receiver is a device utilized to make transactions using the contactless smart card. Responsive to determining the communication, the method determines an electrical resistance of the antenna circuit and determines whether the electrical resistance is the authenticating electrical resistance. The method also comprises of authorizing a transaction with the receiver when the electrical resistance is the authenticating electrical resistance.

DETAILED DESCRIPTION

Figure 1:
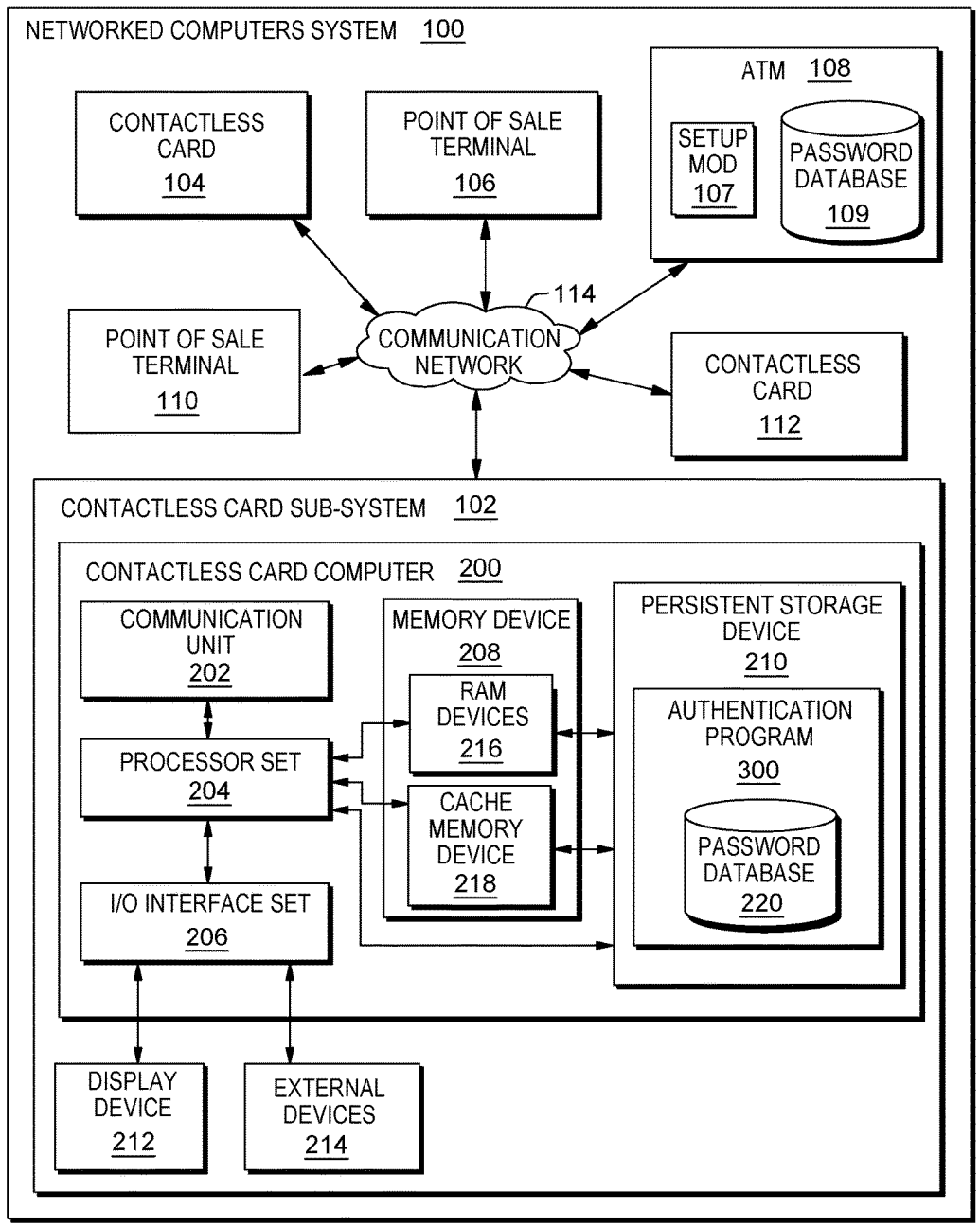
FIG. 1 is a block diagram view of a first embodiment of a system according to the present invention.

A folding mechanism is used to authenticate purchases when making transactions using a contactless smart card. By folding the contactless card in a precise manner, the electrical resistance of the antenna circuit of the contactless card is changed by bypassing the card's built-in resistors. A user may set a folding orientation as the "password" of the contactless card. This folding orientation determines the electrical resistance of the card necessary to authenticate a purchase. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: contactless card sub-system 102; contactless card 104, point of sale terminal 106, automated teller machine (ATM) 108, setup module 107, password database 109, point of sale terminal 110, contactless card 112; and communication network 114. Contactless card sub-system 102 contains: contactless card computer 200; display device 212; and external devices 214. Contactless card computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: authentication program 300 and password database 220. Contactless card computer 200 may be a chip embedded in a contactless card such as contactless card 400 of FIG. 4.

Contactless card sub-system 102 is, in many respects, representative of the various computer sub-systems in the present invention. Accordingly, several portions of contactless card sub-system 102 will now be discussed in the following paragraphs.

Contactless card sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. In the embodiments described below, contactless card sub-system 102 is a contactless card such as contactless card 400 shown in FIG. 4. Authentication program 300 is a collection of machine readable instructions and/or data that is used to create, manage, and control certain software functions that will be discussed in detail, below, in the Example Embodiment sub-section of this Detailed Description section.

Contactless card sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between contactless card sub-system 102 and client sub-systems.

Contactless card sub-system 102 is shown as a block diagram with many double arrows. These double arrows (no separate reference numerals) represent a communications fabric, which provides communications between various components of contactless card sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for contactless card sub-system 102; and/or (ii) devices external to contactless card sub-system 102 may be able to provide memory for contactless card sub-system 102.

Authentication program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Authentication program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to contactless card sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with contactless card computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., authentication program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
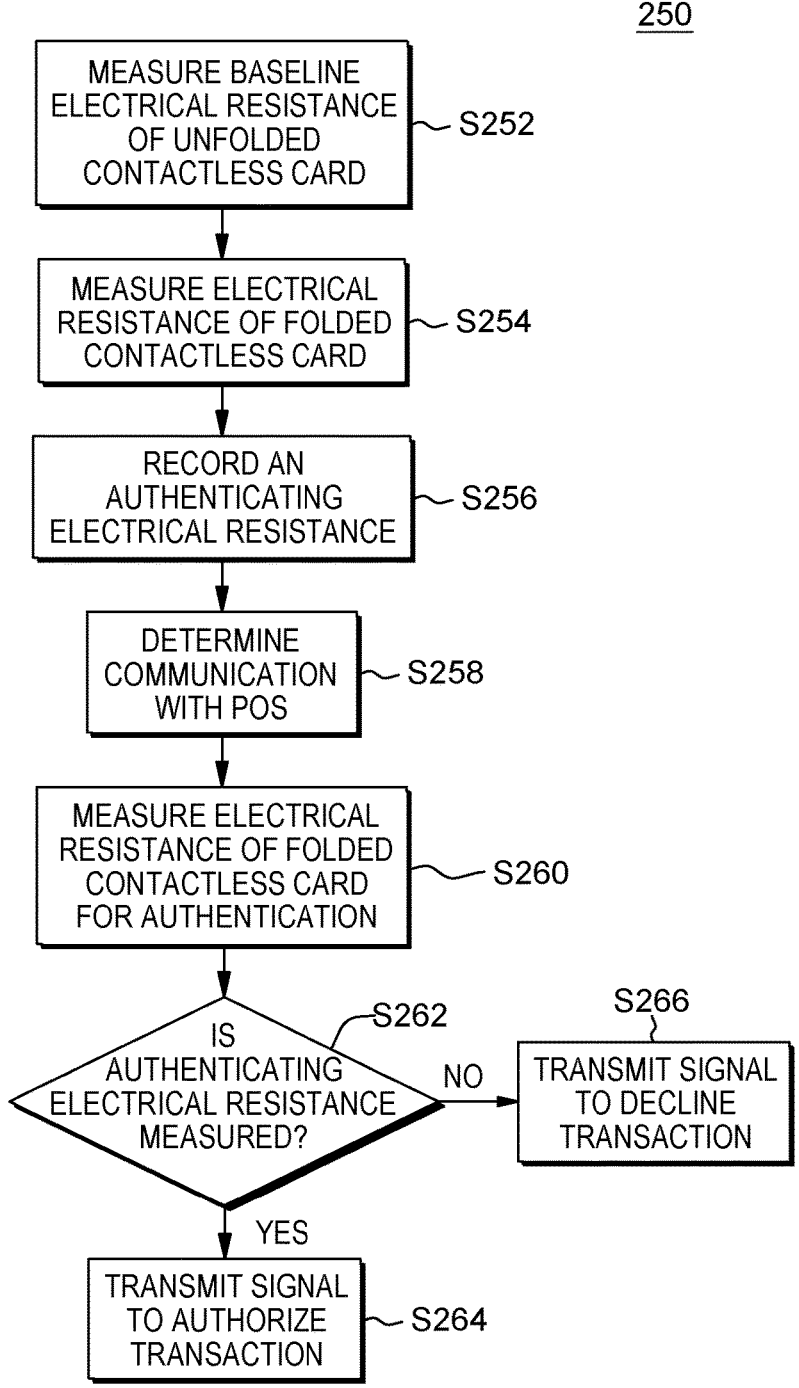
FIG. 2 is a flowchart showing a first embodiment method performed, at least in part, by the first embodiment system.
Figure 3:
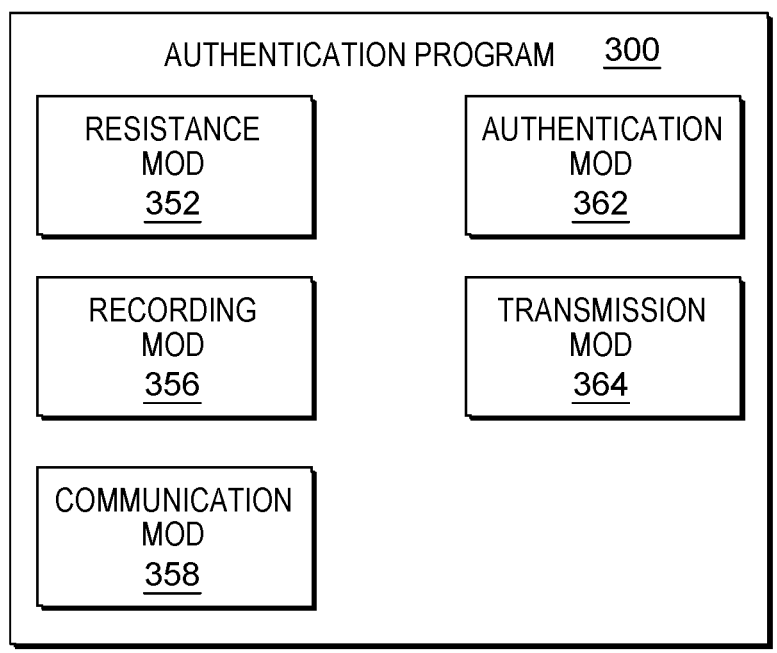
FIG. 3 is a block diagram view of a machine logic (e.g., software) portion of the first embodiment system.

FIG. 2 shows flowchart 250 depicting a method according to the present invention. FIG. 3 shows authentication program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252, where resistance module ("mod") 352 measures the baseline electrical resistance of an unfolded contactless card. The electrical resistance is measured from an ohmmeter on the antenna coil inside a contactless card and measures the difficulty to pass an electric current through the antenna wire. The contactless card contains an antenna that is connected to a microchip. The antenna is used to communicate between a point of sale terminal and the contactless card. The contactless card may be folded along designated folding lines on the contactless card. In this embodiment, the contactless card contains two folds. The contactless card is designed in a manner that allows it to always allow near field communication (NFC) with NFC devices such as a point of sale terminal. The circuit between the antenna and the microchip remains unbroken folded or unfolded allowing the antenna to communicate at all times. The ohmmeter measures the resistance of the contactless card when the contactless card is unfolded. When unfolded, the circuit contains multiple resistors and the resulting resistance of the contactless card would reflect all the resistors implemented in the circuit. In this embodiment, the contactless card contains three resistors in total, with resistances of 10, 20 and 30 ohms. The ohmmeter would measure a resistance of approximately 60 ohms of the unfolded contactless card.

Processing proceeds to operation S254, where resistance mod 352 measures the electrical resistance of the folded contactless card. The contactless card may contain multiple folding edges. A user may fold the contactless card in a unique manner for security reasons. The folding manner of the card may act as a security measure similar to a personal identification number (PIN) of a debit card. The electrical resistance is measured from an ohmmeter on the antenna coil inside a contactless card and measures the difficulty to pass an electric current through the antenna wire. The circuit between the antenna and the microchip remains unbroken when folded, however when folded, resistors may be bypassed. The ohmmeter measures the resulting resistance of the folded contactless card. The folded contactless card's resistance would differ from the unfolded contactless card's resistance due to bypassed resistors on the contactless card's antenna wire. In this embodiment, the user folds the contactless card at one of the fold locations which allows for the 10-ohm resistor to be bypassed. The ohmmeter would measure a resistance of approximately 50 ohms of the folded contactless card, as the circuit would still contain the 20 and 30 ohm resistors.

Processing proceeds to operation S256, where recording mod 356 records an authenticating electrical resistance of the contactless card. In this embodiment, the user folds the contactless card to a desired folding orientation and the electrical resistance of the contactless card is recorded as an authenticating electrical resistance. The authenticating electrical resistance is stored on password database 220, as shown on FIG. 1. The authenticating electrical resistance is used to authenticate transactions using the contactless card. The contactless card needs to be folded in the precise way to result in the authenticating electrical resistance. Transactions are not authenticated unless the contactless card is folded in this precise folding orientation. To setup an authenticating electrical resistance for the contactless card, the user may visit an ATM. As shown in FIG. 1, setup mod 107 and password database 109 are included on ATM 108. Password database 109 stores the authenticating electrical resistance of the user's contactless card. Setup mod 107 is used to setup a new authenticating electrical resistance or modify a previously stored authenticating electrical resistance. The user's contactless card communicates with ATM 108 using communication mod 358. Communication between the contactless card and ATM 108 are conducted utilizing NFC. Setting up an authenticating electrical resistance at ATM 108 is done in a similar manner as setting up a PIN of a debit card. The user may modify the authenticating electrical resistance at the user's discretion.

Processing proceeds to operation S258, where communication mod 358 determines communication with a point of sale (POS) terminal. In this embodiment, the user visits a POS terminal such as a payment terminal at a retail location. As shown in FIG. 1, POS terminals such as point of sale terminal 106 and point of sale terminal 110 may communicate with the user's contactless card. Communication between the contactless card and point of sale terminals 106 and 110 are conducted utilizing NFC. Communication is determined when the contactless card is in proximity and signals from the contactless card's antenna are able to reach the POS terminal. In this embodiment, the user gestures the contactless card in proximity to the POS terminal to determine communication.

Processing proceeds to operation S260, where resistance mod 352 measures the electrical resistance of the folded contactless card when the user folds the contactless card for authentication purposes. In this embodiment, the user attempts to use the contactless card at a POS terminal and folds the contactless card in a manner to achieve the authenticating electrical resistance. The ohmmeter in the contactless card measures the electrical resistance of the contactless card.

Processing proceeds to operation S262, where authentication mod 362 determines whether the authenticating electrical resistance of the contactless card is measured. In this embodiment, the user folds the contactless card in an attempt to achieve the authenticating electrical resistance when at a POS terminal. Authentication mod 362 determines whether the resulting electrical resistance of the folded contactless card is equivalent to the authenticating electrical resistance set up by the user of the contactless card in operation S256. In order for an authenticated transaction to take place with the contactless card and a POS terminal, the electrical resistance of the folded contactless card must be equivalent to the authenticating electrical resistance.

If the electrical resistance of the folded contactless card is equivalent to the authenticating electrical resistance of the contactless card, processing proceeds down the "YES" branch to operation S264, where transmission mod 364 transmits a signal to authorize a transaction. In this embodiment, the user correctly folds the contactless card resulting in the contactless card's electrical resistance to be equivalent to the authenticating electrical resistance. The contactless card securely communicates the user's consumer account information with the POS terminal and authorizes the transaction for the user.

If the electrical resistance of the folded contactless card is not equivalent to the authenticating electrical resistance of the contactless card, processing proceeds down the "NO" branch to operation S266, where transmission mod 364 transmits a signal to decline the transaction. In this embodiment, the user incorrectly folds the contactless card resulting in the contactless card's electrical resistance to be unequal to the authenticating electrical resistance of the contactless card. The contactless card may be configured to be blocked after a number unsuccessful attempts at using the contactless card at a POS terminal to prevent unauthorized use. For example, if the user incorrectly folds the contactless card three times when trying to utilize the contactless card at a POS terminal, the contactless card gets blocked. The user must unblock the contactless card in order to use the contactless card. When the contactless card is blocked, the antenna is turned off.

III. Further Comments and/or Embodiments

Some embodiments of the present invention recognize the following facts, potential problems, and/or potential areas for improvement with respect to the current state of the art. Many people do not use near field communication enabled contactless payment cards for several reasons. One reason is there is not a lot of trust in that they are secure. Two main security concerns as reasons for why people do not trust contactless cards. First, if someone steals a contactless card, that person may be able to make purchases at a convenience. For small purchases, no authentication is required for many contactless cards, often with no PIN or signature requirement. Someone who steals a contactless card may use that contactless card easily until the card gets cancelled by the owner. Second, people could potentially steal money from contactless cards using unauthorized contactless payments. Since often small purchases do not have to be authorized, there has been instances of people stealing from contactless cards by placing POS terminal-like devices near unsuspecting people's pockets. Contactless cards' antennas are always transmitting, so people can theoretically take money from the cards at any time.

Figure 4:
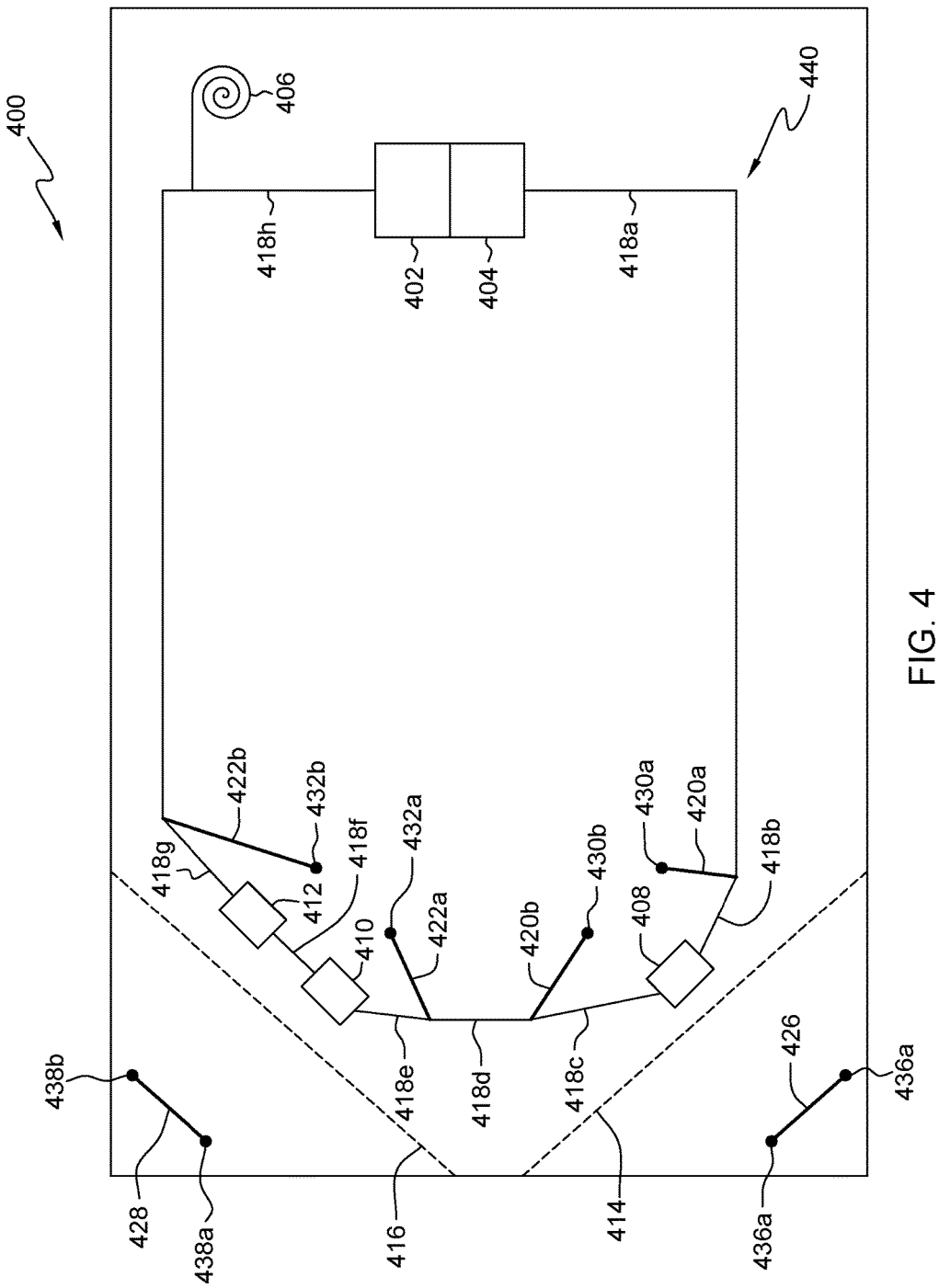
FIG. 4 is a schematic view of an example embodiment of a portion of the first embodiment system according to the present invention.

One example embodiment illustrating the folding mechanics of a contactless card has the corners of the card being folded at hinged locations. FIG. 4 is a schematic view of contactless card 400 according to an embodiment of the present invention. In this embodiment, contactless card 400 includes chip 402, ohmmeter 404, and antenna 406. An example of contactless card 400 is contactless card sub-system 102. An example of chip 402 is contactless card computer 200. Chip 402, ohmmeter 404, and antenna 406 are attached to antenna circuit 440 comprised of conductive wire segments 418a-h. Conductive wire segment 418a is operatively connected to conductive wire segment 418b. Conductive wire segment 418b is operatively connected to resistor 408. Resistor 408 is operatively connected to conductive wire segment 418c. Conductive wire segment 418c is operatively connected to conductive wire segment 418d. Conductive wire segment 418d is operatively connected to conductive wire segment 418e. Conductive wire segment 418e is operatively connected to resistor 410. Resistor 410 is operatively connected to conductive wire segment 418f. Conductive wire segment 418f is operatively connected to resistor 412. Resistor 412 is operatively connected to conductive wire segment 418g. Conductive wire segment 418g is operatively connected to conductive wire segment 418h. Conductive wire segment 418h is operatively connected to conductive wire segment 418a. One end of conductive wire segment 420a is operatively connected to the connection point of conductive wire segments 418a and 418b. Conductive wire segment 420a contains open connection end 430a. One end of conductive wire segment 420b is operatively connected to the connection point of conductive wire segments 418c and 418d. Conductive wire segment 420b contains open connection end 430b. One end of conductive wire segment 422a is operatively connected to the connection point of conductive wire segments 418d and 418e. Conductive wire segment 422a contains open connection end 432a. One end of conductive wire segment 422b is operatively connected to the connection point of conductive wire segments 418g and 418h. Conductive wire segment 422b contains open connection end 432b. In this embodiment, contactless card 400 contains two folding edges, folds 414 and 416. Fold 414 contains conductive wire segment 426. Conductive wire segment 426 contains open connection ends 436a and 436b. Conductive wire segment 426 is placed on fold 414 in a manner where if contactless card 400 is folded at fold 414, open connection ends 436a and 436b of conductive wire segment 426 would be operatively connected to open connection ends 430a and 430b of conductive wire segments 420a and 420b. Fold 416 contains conductive wire segment 428. Conductive wire segment 428 contains open connection ends 438a and 438b. Conductive wire segment 428 is placed on fold 416 in a manner where if contactless card 400 is folded at fold 416, open connection ends 438a and 438b of conductive wire segment 428 would be operatively connected to open connection ends 432a and 432b of conductive wire segments 422a and 422b.

In this embodiment, resistors 408, 410, and 412 have different resistance values. For example, resistor 408 has a resistance of 10 ohms, resistor 410 has a resistance of 15 ohms, and resistor 412 has a resistance of 20 ohms. When contactless card 400 is left unfolded, the baseline resistance of contactless card 400 would be the sum of the resistors in contactless card 400. In this example, if left unfolded, contactless card 400 would have a baseline resistance of 45 ohms. When a user folds contactless card 400 at fold 414, resistor 408 gets bypassed. When a user folds contactless card 400 at fold 416, resistors 410 and 412 get bypassed. Therefore, when a user folds contactless card 400 at fold 414 but does not fold contactless card 400 at fold 416, the resistance of contactless card 400 would be the resistance value of the sum of resistors 410 and 412, or 35 ohms. When a user folds contactless card 400 at fold 416 but does not fold contactless card 400 at fold 414, the resistance of contactless card 400 would be the resistance value of resistor 408, or 10 ohms.

Figure 5:
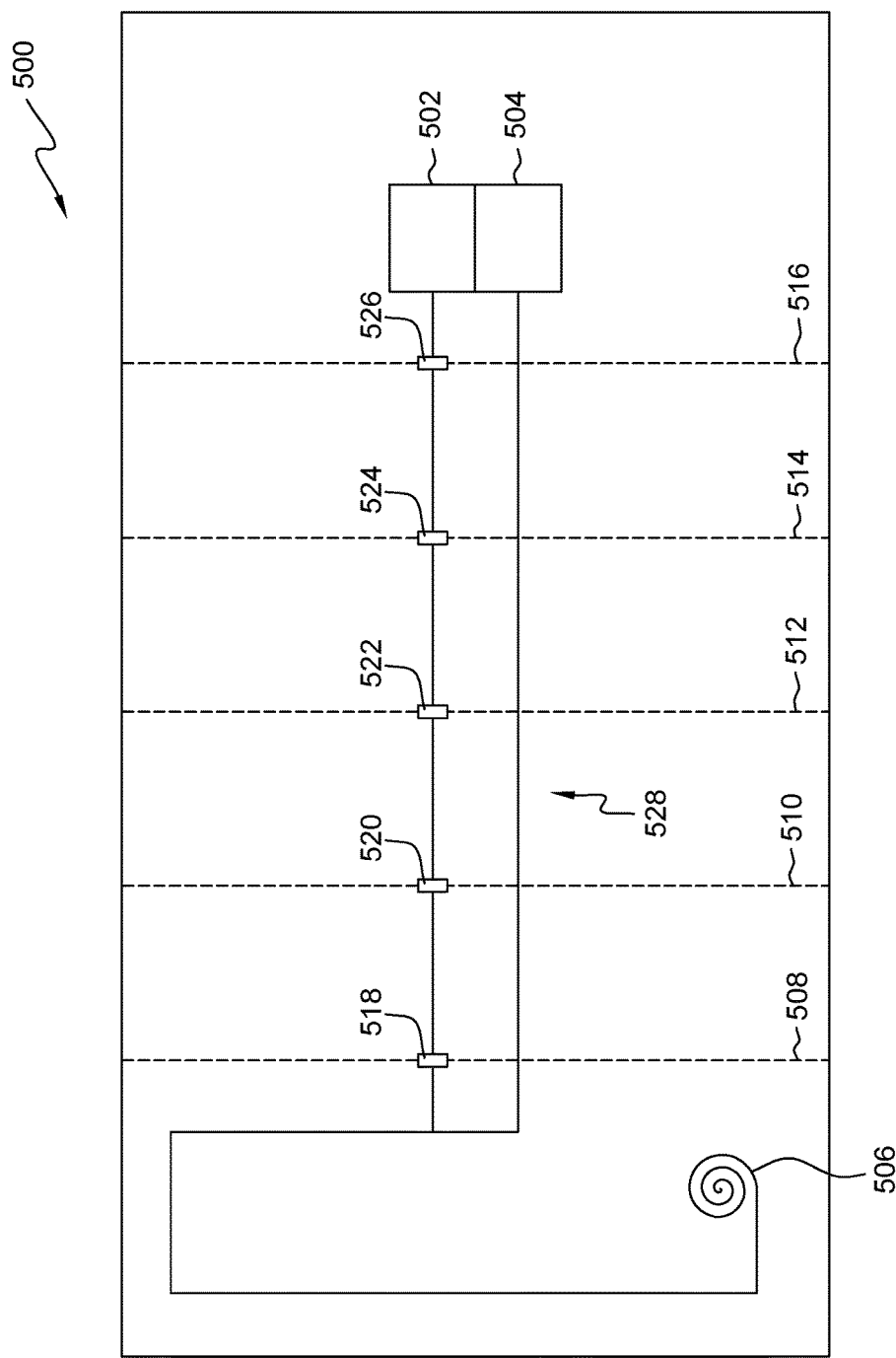
FIG. 5 is a schematic view of a second example embodiment of a portion of the first embodiment system according to the present invention.

One example embodiment illustrating the folding mechanics of a contactless card has the midsections of the card being folded at hinged locations. FIG. 5 is a schematic view of contactless card 500 according to an embodiment of the present invention. In this embodiment, contactless card 500 includes antenna circuit 528, which includes chip 502, ohmmeter 504, antenna 506 and resistors 518, 520, 522, 524, and 526. An example of contactless card 500 is contactless card sub-system 102. An example of chip 502 is contactless card computer 200. Each resistor is located at a hinged location, or a folding edge, on contactless card 500. Contactless card 500 includes multiple hinged locations, or hinges 508, 510, 512, 514, and 516.

In this embodiment, resistors 518, 520, 522, 524, and 526 have different resistance values. For example, resistor 518 has a resistance of 3 ohms, resistor 520 has a resistance of 5 ohms, resistor 522 has a resistance of 7 ohms, resistor 524 has a resistance of 11 ohms and resistor 526 has a resistance of 13 ohms. When contactless card 500 is left unfolded, the baseline resistance of antenna circuit 528 would be the sum of the resistors. In this example, if left unfolded, contactless card 500 would have a baseline resistance of 39 ohms. When a user folds contactless card 500 at hinge 508, resistor 518 gets bypassed in favor of an alternative conductive path. In some embodiments, the alternative conductive path exists on another layer of the contactless card and may be present on the opposite side of the card. A user may fold the contactless card at one or more hinges to change the resistance of antenna circuit 528. Therefore, for example, when a user folds contactless card 500 at hinges 508 and 514 but does not fold contactless card 400 at hinges 510, 512 and 516, the resistance of antenna circuit 528 would be the resistance value of the sum of resistors 520, 522 and 526, or 25 ohms.

Some embodiments of the present invention may include one, or more, of the following features, characteristics, and/or advantages. Folding contactless card payment authentication provides a method for users to decide when to enable the antenna on contactless card, and therefore only enable the antenna when users are about to make a payment. It also adds an extra layer of complexity that unauthorized users must overcome to use the contactless card. This is achieved by having a contactless card with an antenna circuit, which can be completed when the user folds the card into a specific position. The advantages of this is the contactless card would not work when an unauthorized user swipes a contactless reader next to you. One proposed solution is using a RFID shielding wallet that acts as a faraday cage. A RFID shielding wallet shields a contactless card from electromagnetic signals such as unwanted payment contacts. Folding contactless card do not necessarily need to be shielded from unwanted electromagnetic signals and can be uses in any standard wallet.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method for authenticating purchases of a contactless smart card, the method comprising:
   recording an authenticating electrical resistance of an antenna circuit on the contactless smart card;

determining communication between the contactless smart card and a receiver;

responsive to determining the communication, determining an electrical resistance of the antenna circuit; and determining whether the electrical resistance is the authenticating electrical resistance;

authorizing a transaction with the receiver when the electrical resistance is the authenticating electrical resistance;

wherein:

the authenticating electrical resistance is recorded when the contactless smart card is folded one or more times; and the receiver is a device utilized to make transactions using the contactless smart card.

2. The method of claim 1, further comprising:

determining a baseline electrical resistance of the contactless smart card when unfolded.

3. The method of claim 1, wherein the contactless smart card contains a plurality of folds.

4. The method of claim 3, wherein the plurality of folds on the contactless smart card contains a manner for which, when folded, at least one resistor on the contactless smart card is not implemented into the antenna circuit.

5. The method of claim 1, wherein the contactless smart card contains an ohmmeter and a plurality of resistors on the antenna circuit.

6. The method of claim 5, wherein the electrical resistance is measured from the antenna circuit by the ohmmeter.

7. The method of claim 1, wherein the authenticating electrical resistance is determined by a user of the contactless smart card and is modifiable.

8. A computer program product for authenticating purchases of a contactless smart card, the computer program product comprising:

one or more computer-readable storage media, and program instructions stored on the one or more computer-readable storage media, executable by one or more processors, the stored program instructions comprising:

program instructions to record an authenticating electrical resistance of an antenna circuit on the contactless smart card;

program instructions to determine communication between the contactless smart card and a receiver;

responsive to program instructions to determine the communication, program instructions to determine an electrical resistance of the antenna circuit; and program instructions to determine whether the electrical resistance is the authenticating electrical resistance;

program instructions to authorize a transaction with the receiver when the electrical resistance is the authenticating electrical resistance;

wherein:

the authenticating electrical resistance is recorded when the contactless smart card is folded one or more times; and the receiver is a device utilized to make transactions using the contactless smart card.

9. The computer program product of claim 8, the stored program instructions further comprising:

program instructions to determine a baseline electrical resistance of the contactless smart card when unfolded.

10. The computer program product of claim 8, wherein the contactless smart card contains a plurality of folds.

11. The computer program product of claim 10, wherein the plurality of folds on the contactless smart card contains a manner for which, when folded, at least one resistor on the contactless smart card is not implemented into the antenna circuit.

12. The computer program product of claim 8, wherein the contactless smart card contains an ohmmeter and a plurality of resistors on the antenna circuit.

13. The computer program product of claim 12, wherein the electrical resistance is measured from the antenna circuit by the ohmmeter.

14. The computer program product of claim 8, wherein the authenticating electrical resistance is determined by a user of the contactless smart card and is modifiable.

15. A computer system for authenticating purchases of a contactless smart card, the computer system comprising:

one or more computer processors;

one or more computer readable storage device;

program instructions stored on the one or more computer readable storage devices for execution by at least one of the one or more computer processors, the stored program instructions comprising:

program instructions to record an authenticating electrical resistance of an antenna circuit on the contactless smart card;

program instructions to determine communication between the contactless smart card and a receiver;

responsive to program instructions to determine the communication, program instructions to determine an electrical resistance of the antenna circuit; and program instructions to determine whether the electrical resistance is the authenticating electrical resistance;

program instructions to authorize a transaction with the receiver when the electrical resistance is the authenticating electrical resistance;

wherein:

the authenticating electrical resistance is recorded when the contactless smart card is folded one or more times; and the receiver is a device utilized to make transactions using the contactless smart card.

16. The computer system of claim 15, the stored program instructions further comprising:

program instructions to determine a baseline electrical resistance of the contactless smart card when unfolded.

17. The computer system of claim 15, wherein the contactless smart card contains a plurality of folds.

18. The computer system of claim 17, wherein the plurality of folds on the contactless smart card contains a manner for which, when folded, at least one resistor on the contactless smart card is not implemented into the antenna circuit.

19. The computer system of claim 15, wherein the contactless smart card contains an ohmmeter and a plurality of resistors on the antenna circuit.

20. The computer system of claim 19, wherein the electrical resistance is measured from the antenna circuit by the ohmmeter.

* * * * *